United States Patent [19]

Kawakami et al.

[11] Patent Number: 5,455,719
[45] Date of Patent: Oct. 3, 1995

[54] DATA RECORDING METHOD IN WHICH PILOT SIGNAL PERIOD COINCIDES WITH CUMULATIVE BIT DISPARITIES OF INSERT DATA

[75] Inventors: Yasunori Kawakami, Osaka; Akira Iketani, Higashiosaka; Kei Ichikawa, Osaka; Makoto Goto, Nishinomiya; Haruo Isaka, Yawata, all of Japan

[73] Assignee: Matsushita Electric Industrial Co., Ltd., Osaka, Japan

[21] Appl. No.: 205,415

[22] Filed: Mar. 3, 1994

[30] Foreign Application Priority Data

Mar. 8, 1993 [JP] Japan .................................. 5-046315

[51] Int. Cl.⁶ .............................. G11B 5/09; G11B 20/14; G11B 20/16; H04N 9/89
[52] U.S. Cl. .............................. 360/40; 358/323; 375/20; 375/19
[58] Field of Search .............................. 358/323, 337, 358/320; 360/40, 48, 77.14, 47, 51; 375/114, 20, 19; 341/58; 371/49.1, 52, 53, 54

[56] References Cited

U.S. PATENT DOCUMENTS

| | | | |
|---|---|---|---|
| 4,511,933 | 4/1985 | Hofelt et al. | 360/47 |
| 4,520,346 | 5/1985 | Shimada | 360/40 X |
| 5,136,436 | 8/1992 | Kahlman | 360/40 |
| 5,140,474 | 8/1992 | Kahlman et al. | 360/40 |
| 5,142,421 | 8/1992 | Kahlman et al. | 360/40 |
| 5,245,483 | 9/1993 | Van Gestel | 360/40 |
| 5,258,879 | 11/1993 | Shimotashiro et al. | 360/77.15 X |
| 5,267,099 | 11/1993 | Fujiwara et al. | 360/51 |
| 5,317,457 | 5/1994 | Matsumi et al. | 360/48 |

OTHER PUBLICATIONS

IEEE Transactions on Magnetics, vol. 24, #2, Mar. 1988, KAS Immink, "Signal to Noise Ratio of Pilot Tracking Tones Embedded in Binary Coded Signals", pp. 2004–2009.

Primary Examiner—Aristotelis Psitos
Assistant Examiner—Patrick Wamsley
Attorney, Agent, or Firm—Wenderoth, Lind & Ponack

[57] ABSTRACT

A pilot signal is superposed and recorded on data at the beginning of each track. The beginning portion of the track is constituted only of codewords having a disparity of each 10 bits which is +2, 0 or −2. Also, the cumulative value of the disparities of every 10 bits may fluctuate in a period coinciding with the period of the pilot signal to be superposed. Therefore, the frequency spectrum in the beginning part of the track has a peak at the frequency of pilot signal, and using this peak as the pilot signal, tracking is controlled during reproduction.

20 Claims, 20 Drawing Sheets

→ Recording direction

Run-up pattern A : 1 1 0 1 1 1 0 0 0 1 (Disparity = +2)
Run-up pattern B : 1 0 0 0 1 0 1 1 1 0 (Disparity = 0)
Run-up pattern C : 0 0 1 0 0 0 1 1 1 0 (Disparity = -2)

→ Recording direction

Run-up pattern A : 1 1 0 1 1 1 0 0 0 1 (Disparity = +2)
Run-up pattern B : 0 1 1 1 0 1 0 0 0 1 (Disparity = 0)
Run-up pattern C : 0 0 1 0 0 0 1 1 1 0 (Disparity = -2)

→ Recording direction

Run-up pattern A : 1 1 0 1 1 1 0 0 0 1 (Disparity = +2)
Run-up pattern B : 1 1 0 1 0 0 0 1 0 1 (Disparity = 0)
Run-up pattern C : 0 0 1 0 0 0 1 1 1 0 (Disparity = -2)

FIG. 14

Recording pattern

SYNC-A : 1 1 1 0 1 1 0 0 0 1
         (Disparity = +2)
SYNC-B : 1 0 1 1 1 0 0 1 0 0
         (Disparity = 0)
SYNC-C : 0 0 0 1 0 0 1 1 1 0
         (Disparity = −2)

Recording direction

Reproducing pattern

X X 0 1 0 1 1 1 0 1

Reproducing direction

X : not specified

FIG. 17

| |
|---|
| ID-U-C |
| ID-L-B |
| SYNC-A |
| ID-U-A |
| ID-L-A |
| SYNC-A |
| ID-U-C |
| ID-L-C |
| SYNC-C |
| ID-U-C |
| ID-L-B |
| SYNC-A |
| ID-U-A |
| ID-L-A |
| SYNC-A |

Recording direction ↑

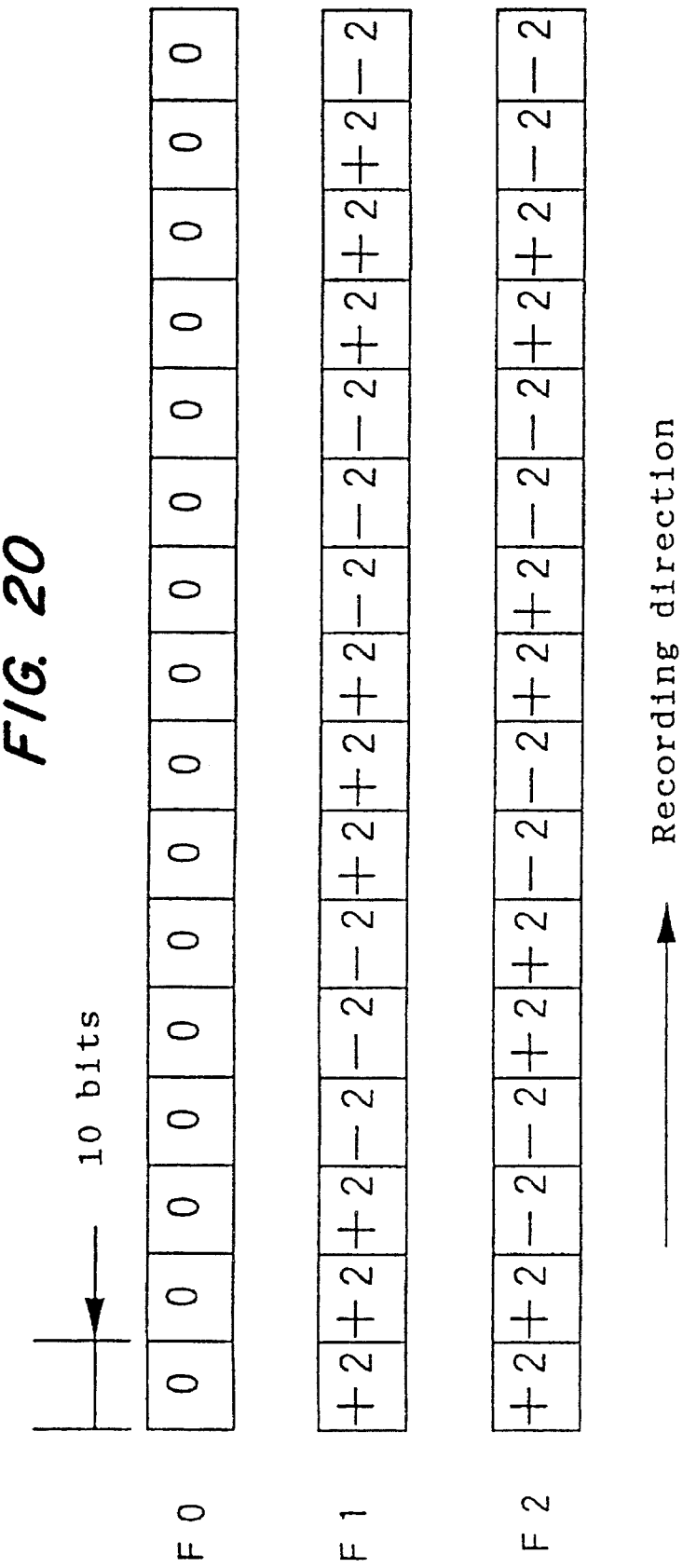

DATA RECORDING METHOD IN WHICH PILOT SIGNAL PERIOD COINCIDES WITH CUMULATIVE BIT DISPARITIES OF INSERT DATA

BACKGROUND OF THE INVENTION

1. Field of the Invention

The present invention relates to a recording method used in a high density magnetic recording apparatus such as a digital recording video cassette recorder (digital VCR).

2. Description of the Prior Art

The digital VCR is currently being studied as a means for recording sounds and pictures by digital signals of 0 and 1 for the purpose of obtaining higher picture quality and higher sound quality. In particular, video signals contain a large amount of information, and to record such signals for a long time period, high density recording of information on a tape is indispensable. Two methods are presently adopted present for high density recording. A first method is to shorten a length necessary for recording one bit, i.e., enhancing a so-called line density. A second method is to narrow a track width.

To enhance the line density, hitherto, improvements in recording materials and signal processing have resulted in a line density of about 0.25 μm for recording one bit. On the other hand, tracking width is said to be limited to around 10 μm in a VCR due to the limitations in the mechanical precision in recording and reproducing, and in tracking control for obtaining a stable reproduced output. In an 8 mm VCR, a pilot signal is superposed and recorded in video signals and audio signals for the purpose of tracking control.

In the case of the digital VCR for recording video signals and audio signals as digital signals, a quantity of information to be recorded is very large as compared with that of an analog VCR. That is, high density recording is more necessary for the digital VCR than the analog VCR.

In the digital VCR, a recording signal band is much wider than in the analog VCR, and it is difficult to assign a frequency for pilot signals in a frequency band other than a signal to be recorded as in the case of the 8 mm VCR. It is thus necessary to assign a pilot signal frequency within the frequency band of the signal to be recorded. Also, to realize a narrow track width, it is necessary to raise a ratio of a amplification level of the pilot signal to a noise level of the pilot signal.

However, when the amplification level of the pilot signal is increased, an amplitude of a signal other than an original signal to be recorded is also increased, and the pilot signal results in a disturbance during reproducing, and an error rate in judging whether each bit is 1 or 0 becomes higher. Accordingly, if a signal other than a signal to be recorded is superposed as the pilot signal, an amplitude of the pilot signal cannot be increased. If the amplitude of the pilot signal cannot be increased, signal to noise ratio (S/N) of the pilot signal in a reproduced signal becomes poor, and the tracking precision is degraded. Therefore, in a system for superposing a signal other than the signal to be recorded as a pilot signal, it is difficult to realize a narrow track width.

SUMMARY OF THE INVENTION

It is hence a primary object of the present invention to present a method for superposing a pilot signal for tracking at the time of production so as not to disturb the judgement of whether a bit is 1 or 0 during reproduction, in a high density magnetic recording apparatus.

To achieve the object, the present invention presents a data recording method for tracking by recording a pilot signal on a track of a recording medium, and reproducing the pilot signal from the recording medium, wherein each codeword has an n-bit (n being 1 or a larger integer), each bit consisting of 1 and 0, and using a codewords of which disparity defined by a difference in a number of 1's and 0's is +k (k being 1 or larger integer) in every n bits, a codeword whose disparity is −k, and a codeword whose disparity is 0, data are recorded so that a period of cumulative value of disparities in every n bits of the codewords is equal to a period of the pilot signal.

A data row recorded in such a data recording method is recorded so that the cumulative value of disparities of every n bits may vary in the period of the pilot signal. An increase or decrease of the cumulative value of disparities is the pilot signal. In the present invention, since the data row to be recorded itself generates the pilot signal, an error rate is not increased if recorded by enlarging an increase or decrease of disparities so that the amplitude of the pilot signal may be larger.

In the data recording method of the present invention, it is possible to effect recording by increasing amplitude of the pilot signal for tracking at a time of reproduction without increasing the error rate during reproduction, so that a system having a narrow track width can be realized.

BRIEF DESCRIPTION OF THE DRAWINGS

FIG. 14 is a bit patten showing a second example of an ITI synchronization codeword.

FIG. 17 is a diagram showing an example of a selection order of each codeword in region ITI.

FIG. 20 is a diagram showing another disparity of every 10 bit of data patterns.

DESCRIPTION OF THE PREFERRED EMBODIMENTS

Figure 3A:
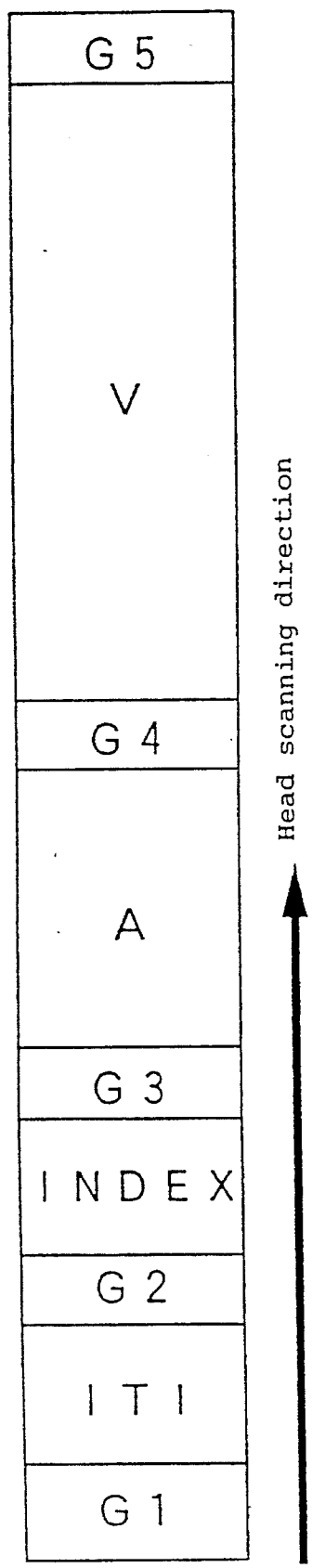
FIGS. 3(A) and 3(B) are diagrams of track patterns according to the embodiment of the present invention.
Figure 3B:
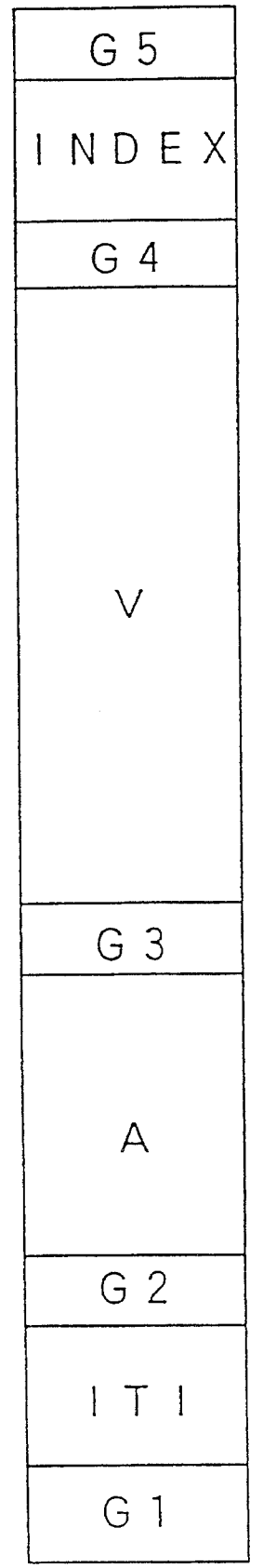

FIG. 3(A) and 3(B) show configurations of two track patterns in an embodiment of the present invention. Regions A and V are audio and video data recording regions. INDEX is a region for recording time code and other information. G2 to G4 are regions provided for inserting and recording regions INDEX, A and V individually. A recording amplifier is turned on or off in these regions. G5 is provided to prevent the old data from being left over when overwritten. G1 and ITI are regions for recording insert information for insert recording to replace the data in at least one region among the regions A, V and INDEX.

Figure 4:
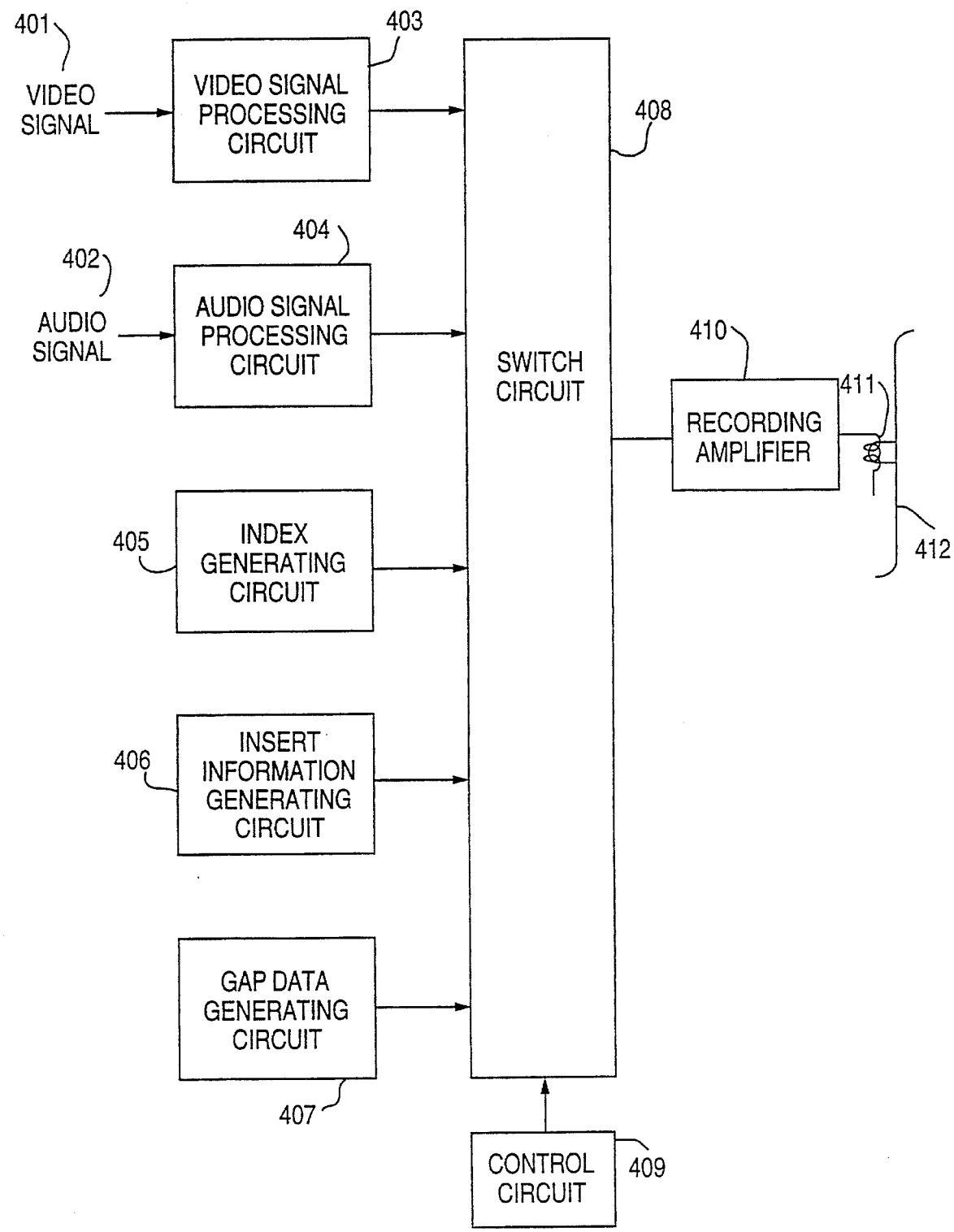
FIG. 4 is a block diagram of a recording apparatus of the embodiment of the present invention.

FIG. 4 shows an example of a recording apparatus for recording the track patterns in FIGS. 3(A) and 3(B). A video signal 401 is fed into a video signal processing circuit 403. An audio signal 402 is fed into an audio signal processing circuit 404. The video signal processing circuit 403 processes an input video signal by error correction coding or the like, and outputs the processed signal to a switch circuit 408. The audio signal processing circuit 404 processes an input audio signal by error correction coding or the like, and outputs the processed signal to the switch circuit 408. An INDEX generating circuit 405 generates additional information such as time code data and outputs such data to the switch circuit 408. An insert information generating circuit 406 generates insert information, and output corresponding data to the switch circuit 408. An output signal from the insert information generating circuit 406 is recorded in the regions G1 and ITI in the track patterns shown in FIGS. 3(A) and 3(B). A GAP data generating circuit 407 generates the data to be recorded in regions G2, G3, G4 and G5 in FIG. 3, and outputs the data to the switch circuit 408. The switch circuit 408 receives a control signal from a control circuit 409, and selectively outputs to a recording amplifier 410 signals from the video signal processing circuit 403, audio signal processing circuit 404, INDEX generating circuit 405, and insert information generating circuit 406. The control circuit 409 send out a control signal to the switch circuit 408 so that an output signal of the switch circuit 408 may be recorded on the tape in the track patterns shown in FIG. 3. The recording amplifier 410 amplifies the output signal of the switch circuit 408, and transmits the thus amplified signal to a recording head 411. The recording head 411 records an output signal from the recording amplifier 410 in a magnetic tape 412.

Referring now to an example of the track patterns shown in FIG. 3(B), an operation of the recording apparatus shown in FIG. 4 for recording this track pattern is described.

At the beginning of each track, the insert information generating circuit 406 transmits the data to be recorded in region G1 in FIG. 3(B). The control circuit 409 sends out a control signal to the switch circuit 408 so that the switch circuit 408 may select the output signal of the insert information generating circuit 406. The switch circuit 408 selects the output signal of the insert information generating circuit 406, and transmits the selected signal to the recording amplifier 410.

The insert information generating circuit 406 transmits data to be recorded in the region ITI. The control circuit 409 issues a control signal so that the switch circuit 408 consecutively selects the output signal of the insert information generating circuit 406. The switch circuit 408 selects the output signal of the insert information generating circuit 406 consecutively according to the control signal from the control circuit 409, and transmits corresponding data to the recording amplifier 410.

The GAP data generating circuit 407 generates the data to be recorded in the region G2, and outputs the same to the switch circuit 408. The control circuit 409 sends out a control signal to the switch circuit 408 so as to select the output signal of the GAP data generating circuit 407 upon reaching the time for recording region G2. The switch circuit 408 selects the output signal of the GAP data generating circuit 407 according to the control signal from the control circuit 409, and transmits the selected data to the recording amplifier 410.

The audio signal processing circuit 404 outputs the data to be recorded in region A. The control circuit 409, upon reaching the time for recording region A, sends out a control signal to the switch circuit 408 so as to select the output signal of the audio signal processing circuit 404. The switch circuit 408 selects the output signal of the audio signal processing circuit 404 according to the control signal from the control circuit 409, and outputs the thus selected data to the recording amplifier 410.

In GAP data generating circuit 407 generates the data to be recorded in region G3, and output the same to the switch circuit 408. The control circuit 409, upon reaching the time for recording region G3, sends out a control signal to the switch circuit 408 so as to select the output signal of the GAP data generating circuit 407. The switch circuit 408 selects the output signal of the GAP data generating circuit 407 according to the control signal from the control circuit 409, and outputs the selected data to the recording amplifier 410.

The video signal processing circuit 403 outputs the data to be recorded in the region V. The control circuit 409, upon reaching the time for the region V, sends out a control signal to the switch circuit 408 so as to select an output signal of the video signal processing circuit 403. The switch circuit 408 selects the output signal of the video signal reprocessing circuit 403 according to the control signal from the control circuit 409, and outputs the selected data to the recording amplifier 410.

The GAP data generating circuit 407 generates data to be recorded in the region G4, and outputs the same to the switch circuit 408. The control circuit 409, upon reaching the time for recording the region G4, sends out a control signal to the switch circuit 408 so as to select the output signal of the GAP data generating circuit 407. The switch circuit 408 selects the output signal of the GAP data generating circuit 407 according to the control signal from the control circuit 409, and transmits corresponding data to the recording amplifier 410.

Next, the INDEX generating circuit 405 sends out the data to be recorded in the region INDEX. The control circuit 409, upon reaching the time for recording the region INDEX, sends out a control signal to the switch circuit 408 so as to select an output signal of the INDEX generating circuit 405. The switch circuit 408 selects the output signal of the INDEX generating circuit 405 according to the control signal from the control circuit 409, and transmits the selected data to the recording amplifier 410.

The GAP data generating circuit 407 generates data to be recorded in the region G5, and transmits the same to the switch circuit 408. The control circuit 409, upon reaching the time for recording in the region G5, sends out a control signal to the switch circuit 408 so as to select the output signal of the GAP data generating circuit 407. The switch circuit 408 selects the output signal of the GAP data generating circuit 407 according to the control signal from the control circuit 40, and transmits the thus selected data to the recording amplifier 410. The recording amplifier 410 outputs the output signal of the switch circuit 408 to the recording head 411, and the recording head 411 records on the magnetic tap 412.

In the above-described manner, the recording apparatus shown in FIG. 4 records the track pattern shown in FIG. 3(B) on a magnetic tap.

In the tape recording by such a recording apparatus, by reproducing the insert information recorded in the regions G1 and ITI in FIG. 3(B), tracking is controlled so that the head can trace accurately on the track, and insert recording for accurately rewriting at least one of the regions INDEX, A and V can be realized.

Figure 5A:
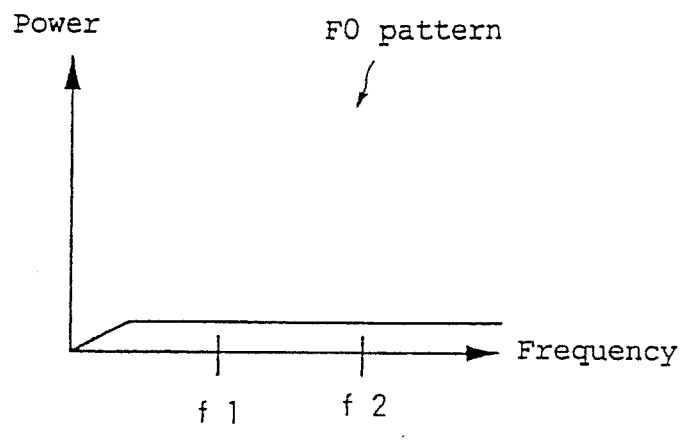
FIGS. 5(A), 5(B) and 5(C) are diagrams showing frequency spectrums of $F_n$ patterns recorded in the embodiment of the present invention.
Figure 5B:
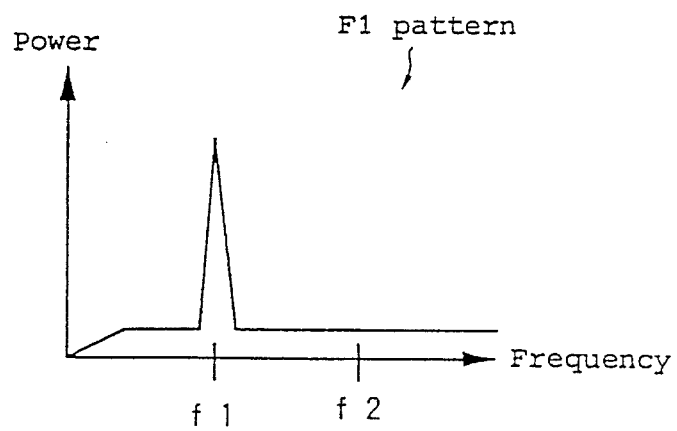
Figure 5C:
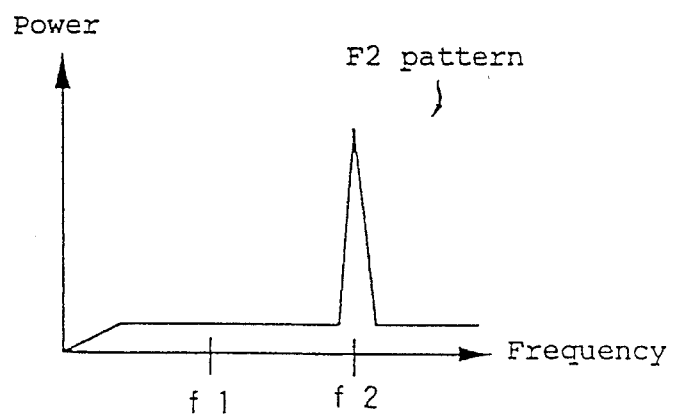
Figure 6:
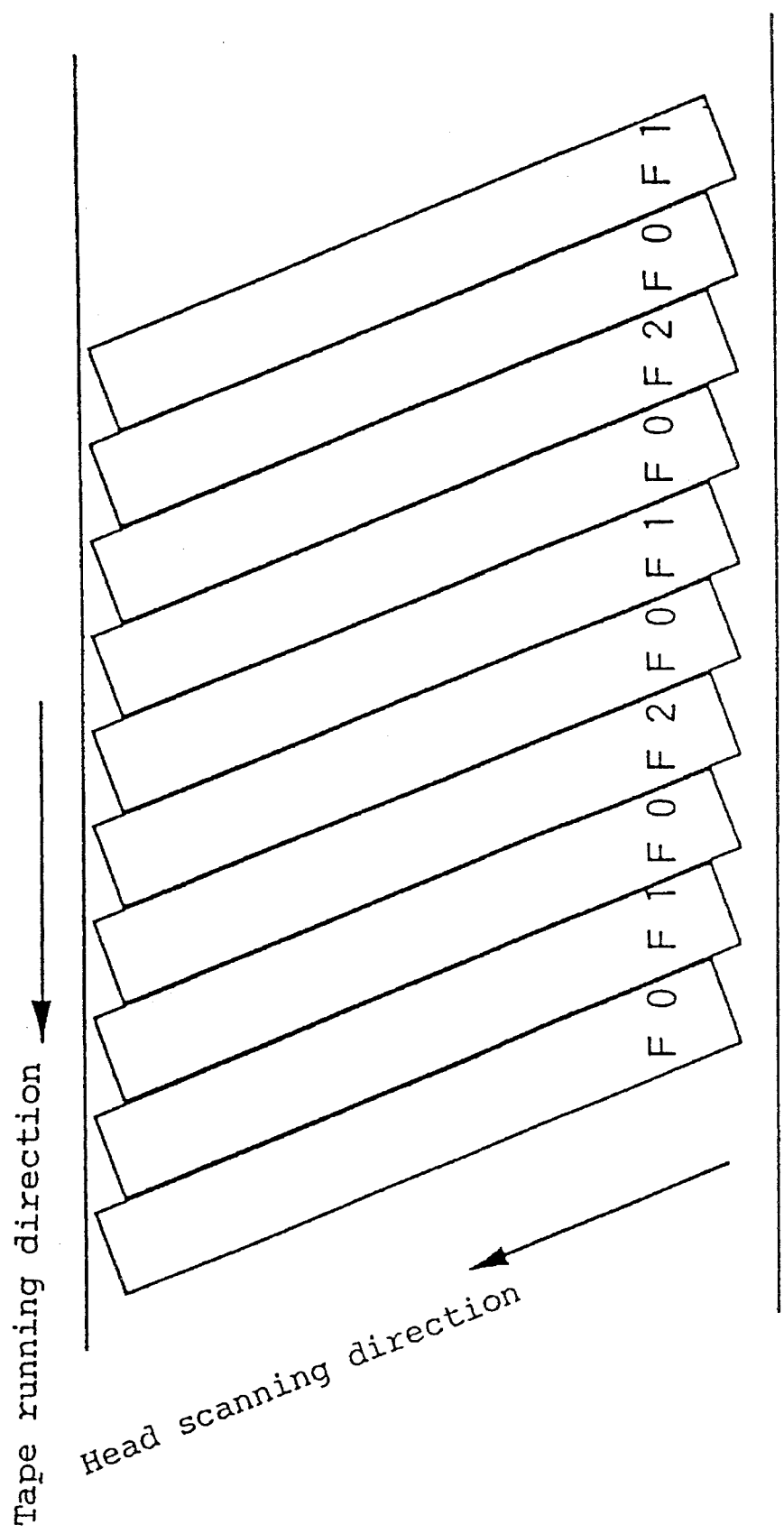
FIG. 6 is a configuration diagram of three different patterns on a tape to be rerecorded in the embodiment of the present invention.

A method of tracking by reproducing the regions G1 and ITI is described below. FIGS. 5(A), 5(B) and 5(C) show frequency spectrums of data patterns recorded in the regions G1 and ITI. As shown, the frequency spectrum of the regions G1 and ITI is available in three types, F0, F1 and F2. A peak value at frequency f1 in the type F0 is much smaller than that in the type F1, and a peak level at frequency f2 in the type F0 is much smaller than that in the type F2. The type F1 possess a peak at the frequency f1, and the peak level at the frequency f2 in the type F1 is much smaller than that in the type F2. The type F2 possess a peak at the frequency f2, and the peak level at the frequency f1 in the type F2 is much smaller than that in the type F1. Frequencies f1 and f2 in the embodiment are respectively $1/90$ and $1/60$ of the recording frequency. These patterns are disposed on the tape as shown in FIG. 6. In tracks before and after the track having the spectrum of the type F0, track so the types F1 and F2 are disposed. When the recording head is on the track of the type F0, by nature, since the spectrum of the type F0 does not possess peaks at frequencies f1 and f2, a peak would not be detected at frequencies f1 and f2 of the reproduced signal of the track of the type F0. However, peaks are nevertheless formed at frequencies f1 and f2 in the reproduced signal of the type F0 due to crosstalk from the adjacent tracks of the types F1 and F2. When the head is deviated in the direction of the track of the type F1, the f1 frequency component of the reproduced signal of the type F0 increases, and the f2 component decreases at the same time. To the contrary, when the head is deviated in the direction of the type F2, the frequency f1 component decreases, and the frequency f2 component increases. Thus, by reproducing the track of the type F0, it is possible to detect how much and in which direction the head is deviated relative to the target track, and tracking is controlled by adjusting the tape feed speed so as to compensate for the deviation.

Figure 7:
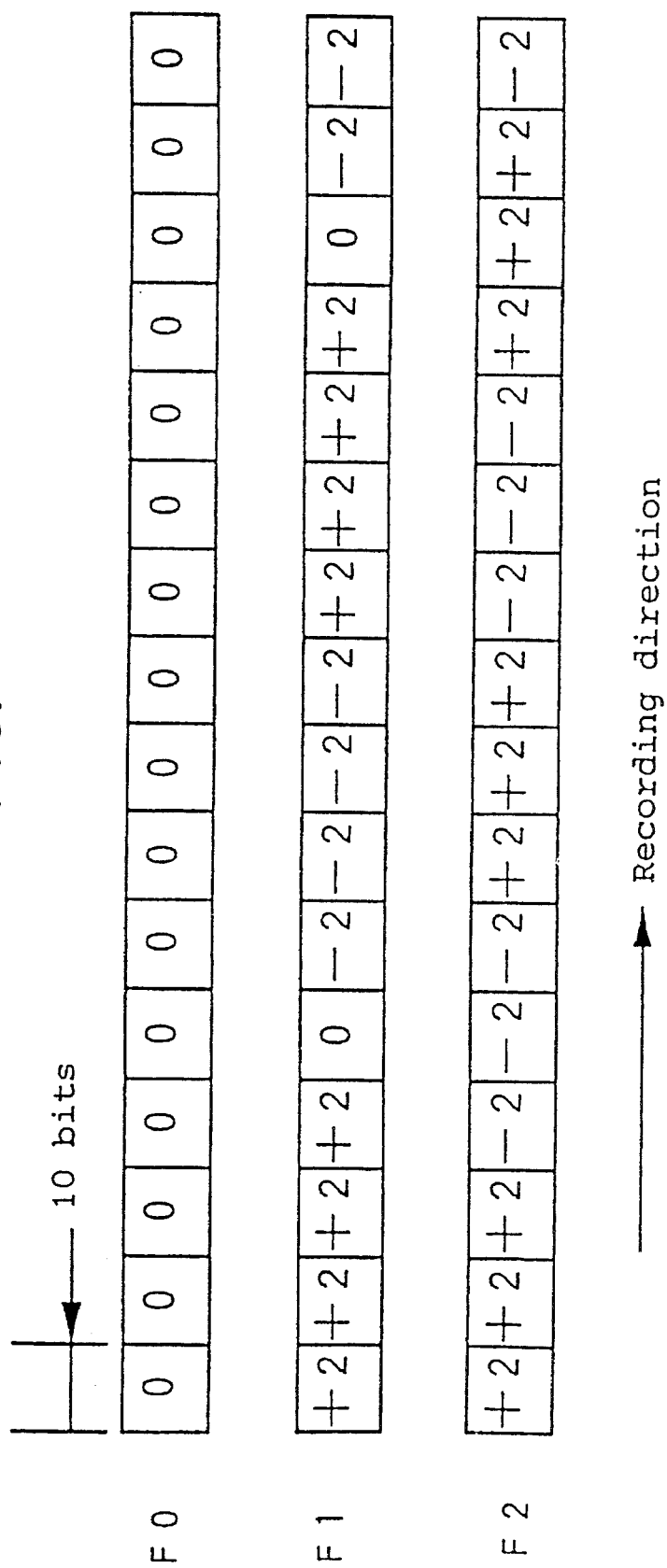
FIG. 7 is a diagram showing a disparity of every 10 bits of data patterns.
Figure 8:
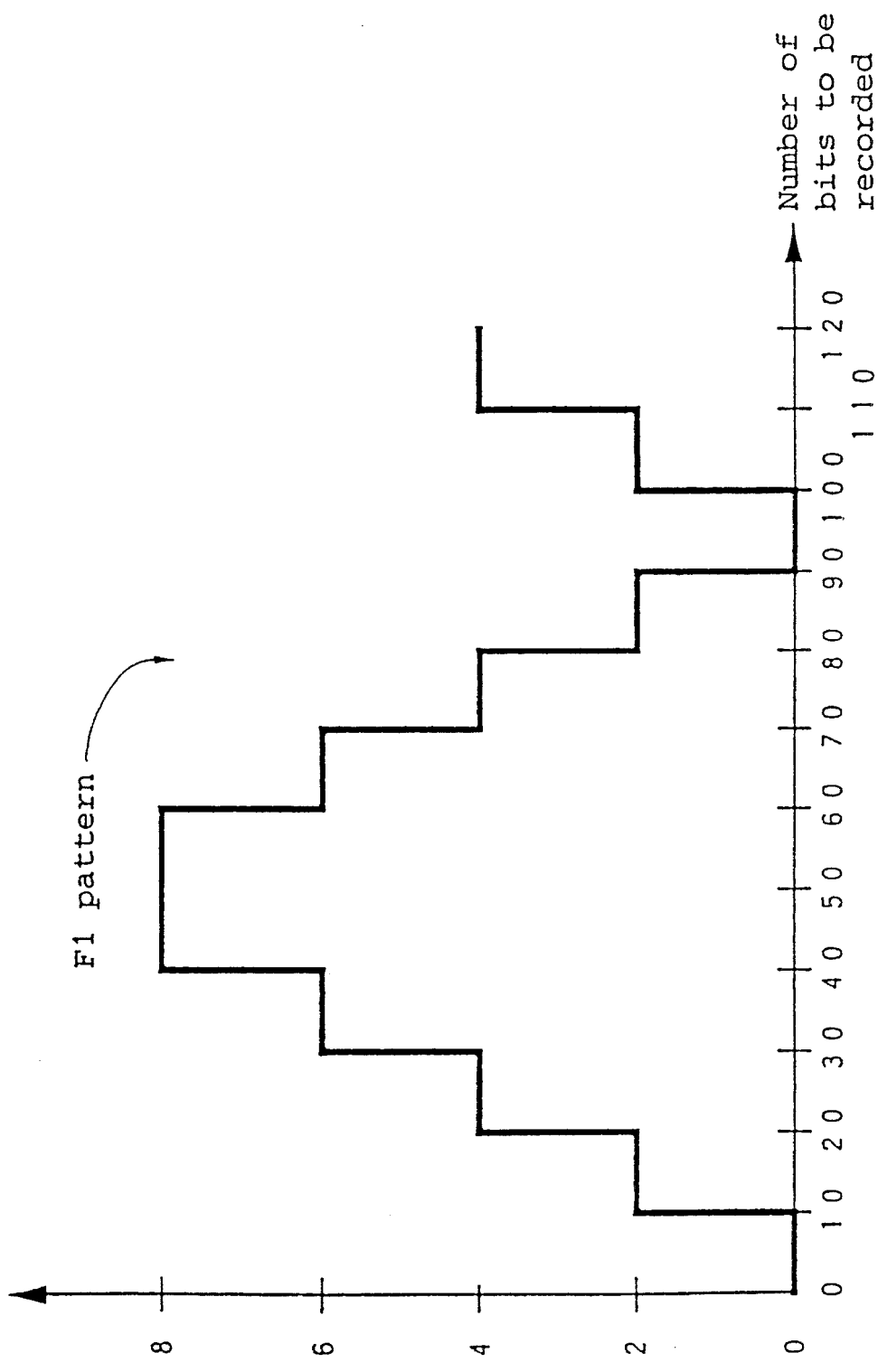
FIG. 8 is a diagram showing variations of a cumulative value of disparities of every 10 bits of the data pattern at frequency F1.

A pilot signal is generated by recording the regions G1 and ITI as follows. The insert information to be recorded in the regions G1 and ITI is composed only of 10-bit codewords of which disparity is every 10 bits is +2, −2 and 0, and by regularly arranging the 10-bit codewords of which disparity in every 10 bits is +2, −2 and 0, the data row of each pattern is created. FIG. 7 shows an example of arrangement of codewords of which disparity in every 10 bits is ±2 and 0. The type F0 records only with 10-bit codewords of which disparity is 0. The types F1 and F2 repeat 10-bit codewords +2, −2 and 0 in the period of the pilot signal. FIG. 8 shows a change of cumulative value of disparity of the recording pattern F1. The data of the type F1 repeatedly increases and decreases the cumulative value of disparity in a period of 90 bits as shown in FIG. 8. By repeating the increase and decrease in a period of $1/90$ of the recording frequency which is the period of the pilot signal, the pilot signal can be generated at a frequency of $1/90$ of the recording frequency. This is because the disparity is a mean of codewords, and when the increase or decrease is periodic, the frequency spectrum corresponding to the period is widened, and this frequency component becomes a pilot signal. The recording pattern of the type F2 also generates a pilot signal at a frequency of $1/60$ of the recording frequency because the cumulative value of disparity similarly repeatedly increases and decreases in a period of $1/60$ of the recording frequency. Also, by raising the absolute value of the disparity in every 10 bits, the amplitude of the pilot signal can be enlarged.

Figure 9:
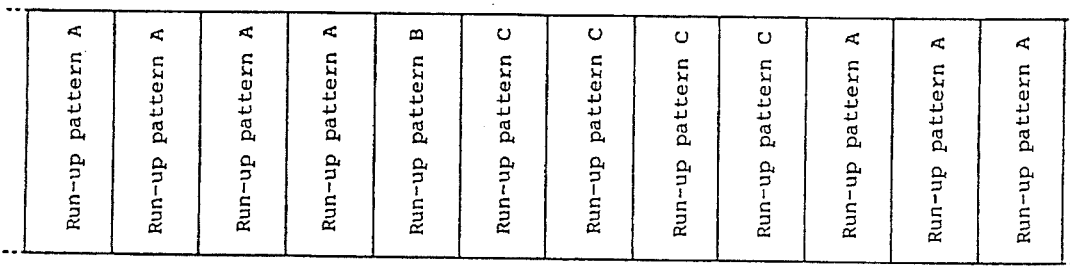
FIG. 9 is a recording patten showing a first example of a selection order of three kinds of run-up data in region G1.
Figure 10:
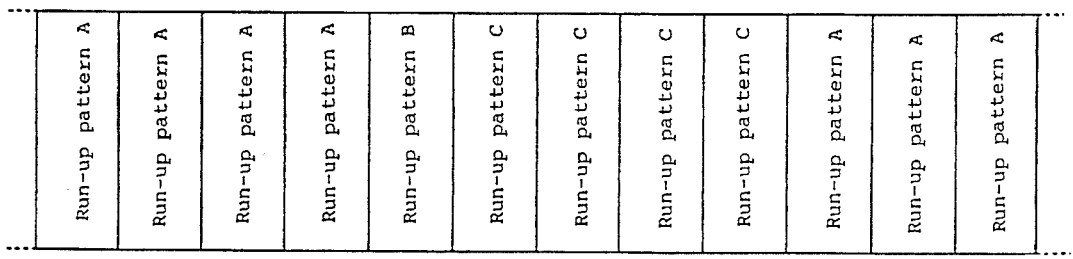
FIG. 10 is a recording pattern showing a second example of a selection order of three kinds of run-up data in region G1.
Figure 11:
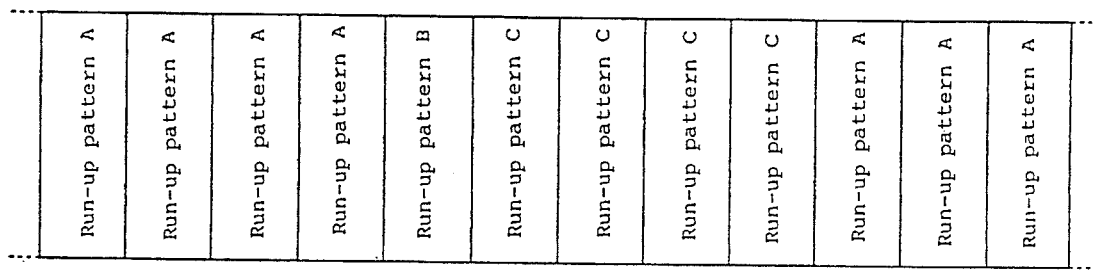
FIG. 11 is a recording pattern showing a third example of a selection order of three kinds of run-up data in region G1.

The apparatus for reproducing digital signals is provided with a circuit (hereinafter called PLL) for generating a synchronization signal (clock) which is generally stable than the reproduced signal. In this embodiment, the region G1 not only generates a pilot signal, but also records run-up data for operating the PLL stably in order to accurately reproduce the data recorded behind the region G1 when reproducing. The region G1 is composed of three kinds of run-up data of which disparity is +2, 0 and 2. FIG. 9 shows a first example of the type F1 pattern in the region G1. The region G1 is composed of three kinds of run-up data, that is, run-up pattern A as run-up data with a disparity of +2, run-up pattern B as run-up data with a disparity of 0, and run-up pattern C has run-up data with a disparity of −2. By arranging the three types of the run-up data as shown in FIG. 9, the cumulative value of disparity of every 10 bits increases and then decreases as shown in FIG. 8, and therefore a pilot signal is generated at frequency f1. In the case of pattern of the type F0 or the pattern of the type F2, the disparity in every 10 bits disposes three kinds of the run-up data as shown in FIG. 7. FIG. 10 and FIG. 11 show other examples of recording patterns of the type F1 in the region G1.

In this embodiment, the region ITI not only generates a pilot signal, but also records position information of the regions A, V and INDEX on the tape in he track pattern shown in FIG. 3. In the case of insert recording of the video signal or after-recording of the audio signal, to replace the data of prerecorded regions A, V and INDEX, it is necessary to identify the data recording positions correctly. In the region ITI, 64 sync blocks each comprising a synchronization codeword and ID codeword are recorded. In a specific sync block from the beginning of the region ITI, the number of that sync block is recorded, and this number is continuously recorded from the beginning sync block of the region ITI. By the number of the sync block detected from the reproduced signal, it is known at which positions on the track the head is preset. Accordingly, it is possible to determine when to record the data of the regions A, V and INDEX, so that the data can be rewritten at accurate positions. Hence, the regions G2 to G4 can be set shorter, and more audio and video data can be recorded. By detecting the region ITI, moreover, the recording positions of the regions A, V and INDEX are recognized in each track, so that insert recording or after-position recording can be conducted if the entire track is largely deviated from the reference position.

Figure 12:
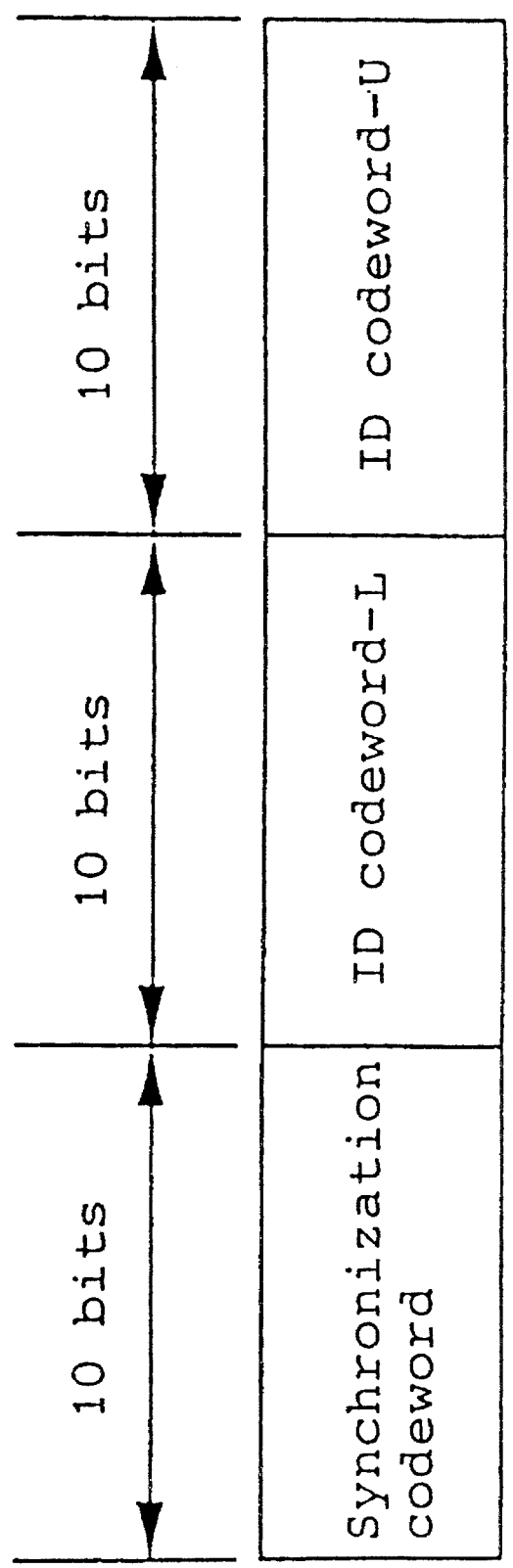
FIG. 12 is a diagram showing the configuration of an ITI sync block.

The region ITI is composed of 64 sync blocks comprising 30 bits each. Of the 64 sync blocks, the block number from the beginning is recorded in the specific sync block. FIG. 12 shows the configuration of sync blocks in the region ITI. This diagram shows a case in which the block number to be coded in the sync block is coded first from the LSB. A sync block is composed of a synchronization codeword of 10 bits, an ID codeword-L of 10 bits, and an ID codeword-U of 10 bits.

Figure 13:
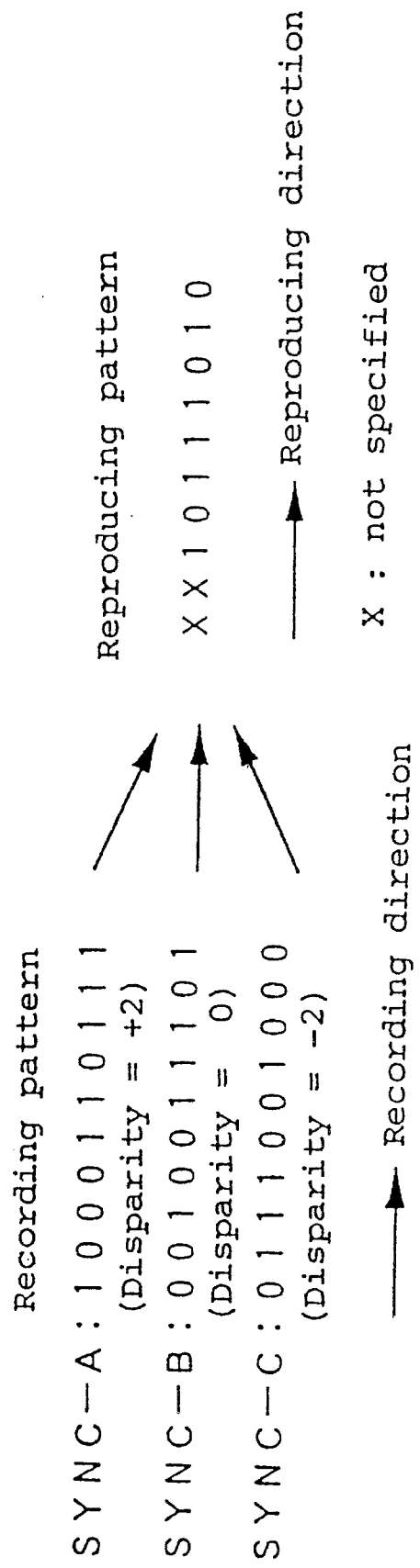
FIG. 13 is a bit patten showing a first example of an ITI synchronization codeword.

FIG. 13 shows an example of bit pattern of a synchronization codeword of the region ITI. There are three types of synchronization codewords, that is SYNC-A with disparity +2, SYNC-B with 0, and SYNCH-C with −2. When recording, there are three synchronization codewords, with are SYNC-A, SYNC-B and SYNC-C, but when detected by partial response 4, the beginning two bits are unstable, and the final eight bits are identical in all three types as shown in FIG. 8. From SYNC-A, SYNC-B and SYNC-C, a pilot signal is generated, and it is selected so that the cumulative value of the disparity may increase and decrease in the period of the pilot signal, and a synchronization codeword is obtained. FIG. 14 shows another example of a bit pattern of a synchronization codeword of the region ITI.

Figure 16:
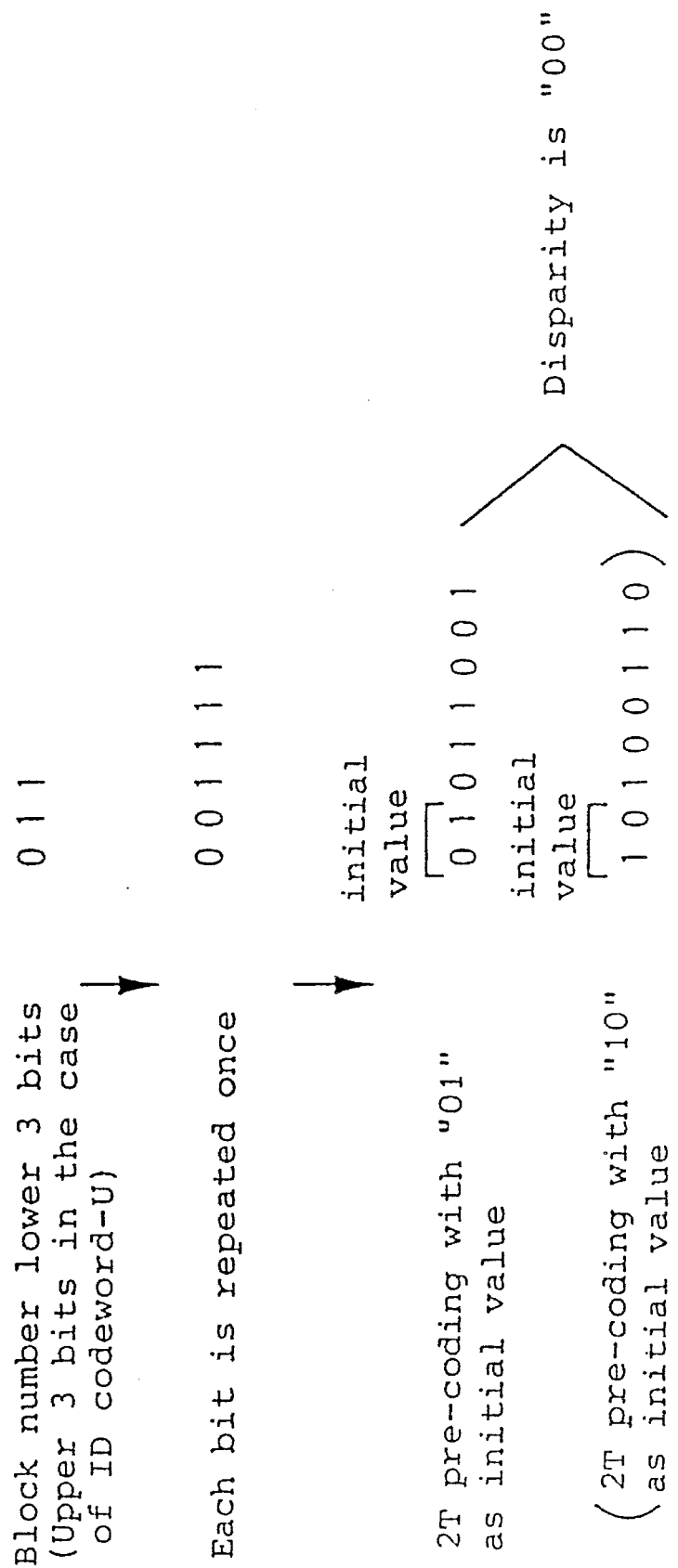
FIG. 16 is a diagram for explaining a coding method of a block number part of an ID codeword-L and an ID codeword-U.

The ID codeword-L is, like the synchronization codeword, available in three types, that is, ID-L-A with a disparity of +2, ID-L-B with a disparity of 0, and IDL-C with a disparity of −2. The ID codeword-L is divided into an 8 bit block number part and a 2 bit dummy part. In the block number part, the lower three bits of the sync block number expresses in 6 bits are coded and recorded. FIG. 16 shows the coding method of the block number part of the ID codeword-L and the ID codeword-U of the region ITI. In FIG. 16, the lower three bits of the block number are 011. As shown in FIG. 16, by repeating once each bit of the lower three bits of the block number, a six-bit code is obtained. ID-L-A and ID-L-B are pre-coded by 2T with the initial value of "01". ID-L-C is pre-coded by 2T with the initial value of "10". Adding two bits as a initial value to the beginning of the 2T pre-coded 6 bits, an 8-bit code is obtained, and the disparity of the 8-bit code is obtained, and the disparity of the 8-bit code is 0 in all three types. Since the disparity of the 8 bits of the block number part is always 0, the disparity of the ID codeword-L is determined in the dummy part. The dummy part of ID-L-A of which disparity is +2 is "11", the dummy part of ID-L-B of which disparity is 0 is "01", and the dummy part of ID-L-C of which disparity is −2 is "00". The ID code -L is selected so that the cumulative value of disparities may be increased and decreased in the period of the pilot in order to generate a pilot signal from the three types ID-L-A, ID-L-B, and ID-L-C.

Figure 15:
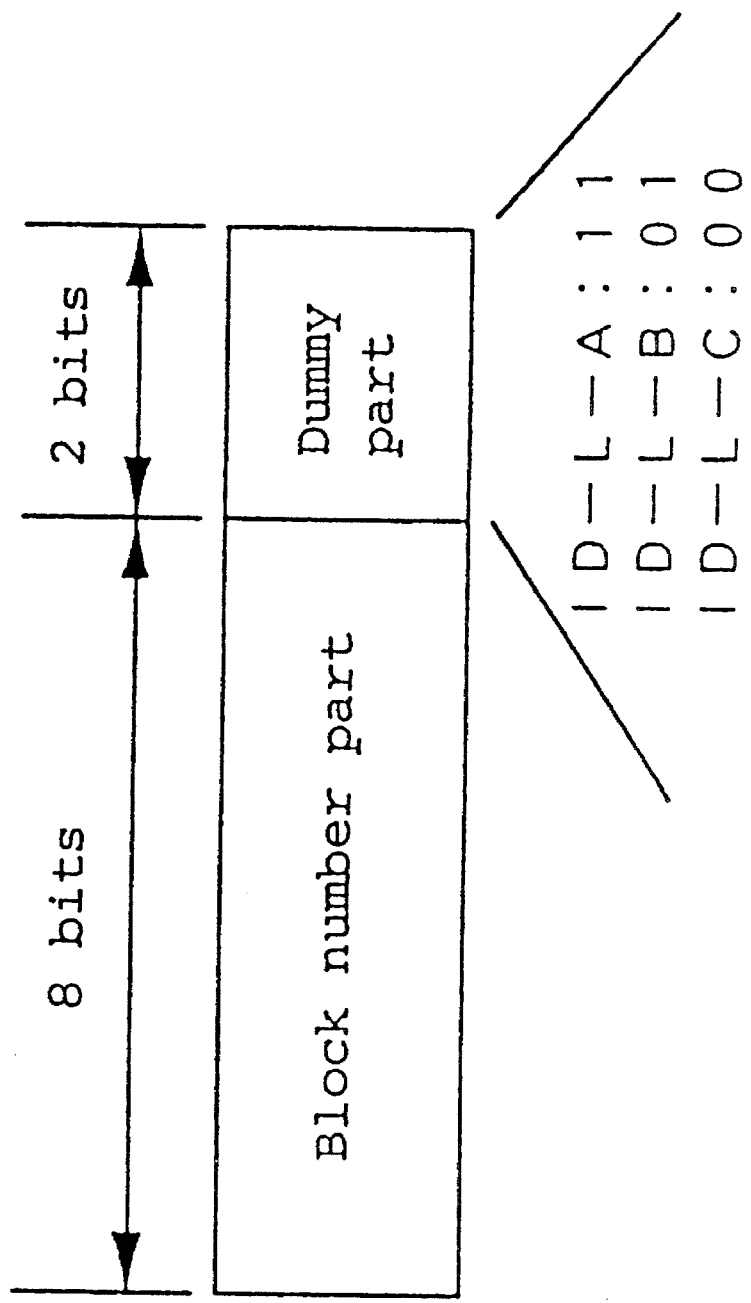
FIG. 15 is a diagram showing a configuration of an ID codeword-L and an example of a dummy part.

The ID codeword-U is available in three types, like the ID codeword-L, that is, ID-U-A with a disparity of +2, ID-UB with a disparity of 0, and ID-U-C with a disparity of −2. The ID codeword-U is, like the ID codeword-L shown in FIG. 15, divided into an 8 bit block number part and a 2 bit dummy part. In the block number part of these three types of the ID codeword-U, the upper three bits of the sync block number expressed in 6 bits are coded and recorded. As shown in FIG. 16, each bit of the upper three bits of the block number is repeated once, and a 6-bit codeword is obtained. ID-U-A and ID-U-B are pre-coded by 2T with the initial value of "01". ID-U-C is pre-coded by 2T with the initial value of "10". Adding two bits as an initial value to the beginning of the 2T pre-coded 6 bits, an 8-bit codeword is obtained, and the disparity of the 8-bit codeword is 0 in all three types. Therefore, the dummy part also determines the disparity of the ID codeword-U. The dummy part of ID-UA of which disparity is +2 is "11" the dummy part of ID-U-B of which disparity is 0 is "01" and the dummy part of ID-U-C of which disparity is −2 is "00". The ID codeword-U is selected so that the cumulative value of disparity may increase and decrease in the period of the pilot signal in order to generate a pilot signal from the three types described above.

FIG. 17 shows the selection sequence of the synchronization codeword, ID codeword-L, and ID codeword-U in the region ITI. By composing the region ITI in this sequence, the cumulative value of disparities in every 10 bits is increased and decreased in the pilot period, so that a pilot signal can be generated. In the boundary of the regions G1 and ITI, by effecting recording so that the increase and decrease of the cumulative value of every 10 bits may be continuous, pilot signals which are continuous between the region G1 and the region ITI can be generated.

Figure 18:
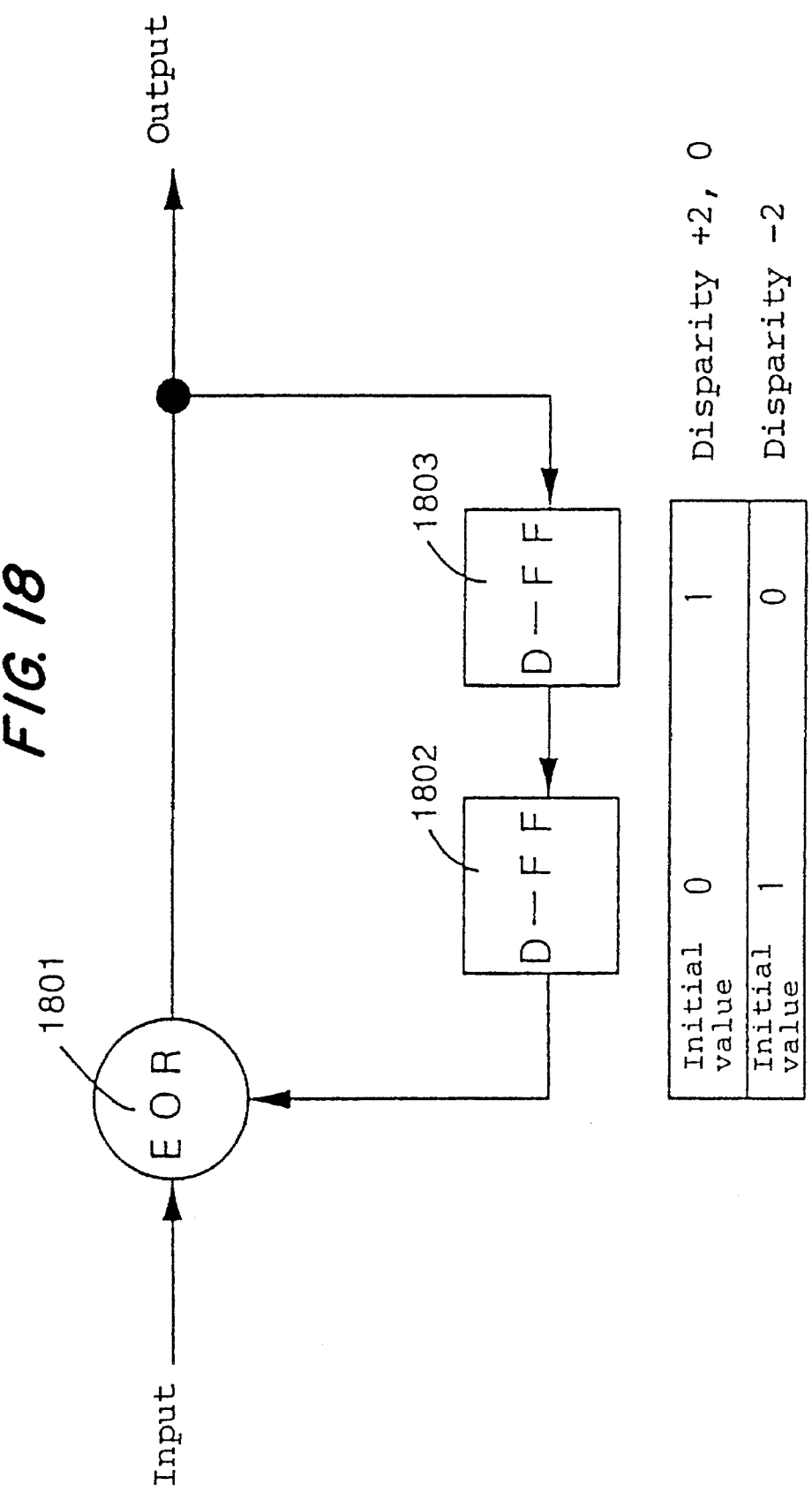
FIG. 18 is a block diagram of a 2T-pre-code.

FIG. 18 shows a block diagram of 2T pre-coding used in coding of ID codeword-L and ID codeword-U. Pre-coding of 2T is effected prior to recording in order to judge whether 1 or 0 in partial response 4 from the reproduced signal. In this embodiment, 2T pre-coding is effected on the 6-bit codeword obtained by repeating once each bit of the lower or upper three bits of the block number, and in the D-FF circuit 1802 and D-FF circuit 1803 shown in FIG. 18, the values of 1, 0 or 0, 1 are respectively loaded as initial values. The initial values of the D-FF circuit 1802 and D-FF circuit 1803 are respectively 0 and 1 when the disparity of ID codeword-L and ID codeword-U to be coded is +2 or 0, and 1 and 0 when the disparity is −2. Each bit of the input 6-bit codeword is calculated with the output of the D-FF circuit 1802 which is an output value from the 2T pre-coding circuit two bits before, by exclusive OR in an EOR circuit 1801, and the result is issued. In this way, the block number parts of the ID codeword-L and ID codeword-U can be detected by partial response 4.

Figure 19:
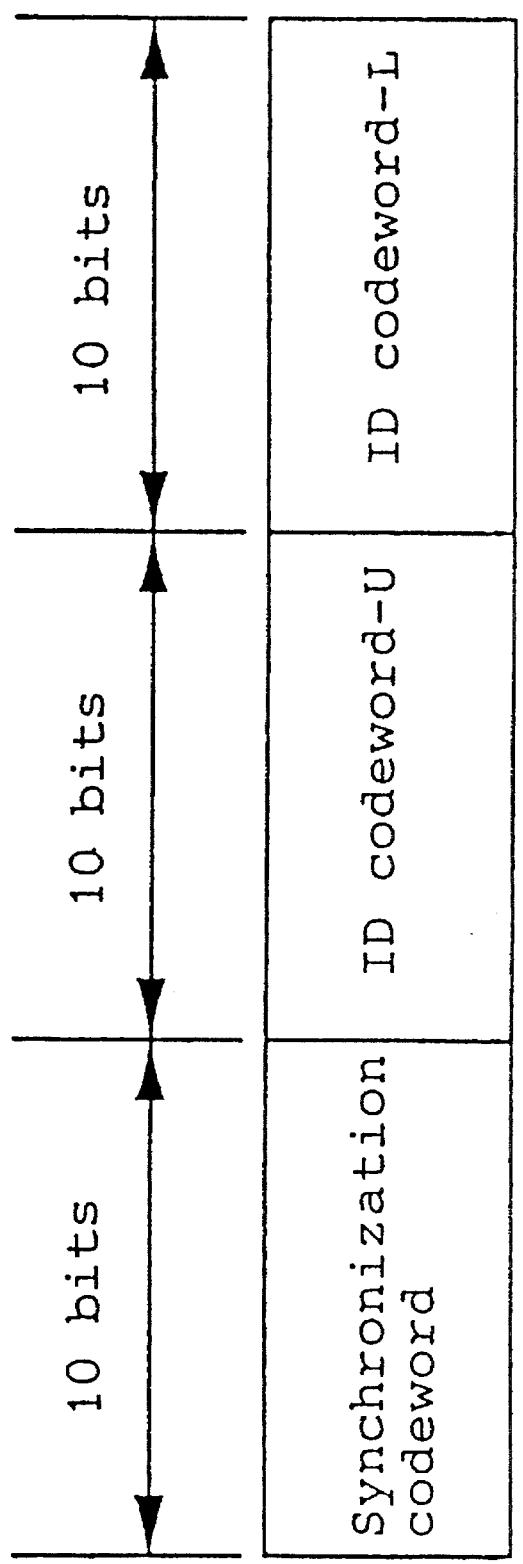
FIG. 19 is a diagram for explaining the configuration of a sync block when recording the block number first from MSB in ITI.

The above explanation relates to an example of coding and recording first from the LSB of each block number in region ITI, but it is also possible to code and record first from the MSB. FIG. 19 shows the constitution of sync block in such a case. In this case, the synchronization codeword is followed by ID codeword-U, which is followed by ID codeword-L. In the upper 3 bits and lower 3 bits of the block number coded in each ID codeword, the upper bits are first coded. In the method of coding, as in FIG. 15 for recording first from the LSB, each bit is repeated once to obtain a 6-bit codeword, and this 6-bit codeword is 2T precoded. In this case, however, upper bits are first 2T precoded. In this case, in the synchronization codeword, the same pattern as when recording the block number first from the LSB is used.

In ID codeword-L, as shown in FIG. 16, since each bit of lower three bits of a block number is repeatedly recorded, a same value is reproduced twice, if there is no error, in the lower three bits of the block number to be reproduced. Therefore, whether or not the lower three bits of the two block numbers being reproduced are the same value may be utilized as the criterion for judging the presence or absence of an error. In the case of ID codeword-U, quite similarly, whether or not the upper three bits of two block numbers being reproduced are the same may be utilized as the criterion for judging the presence or absence of an error.

Figure 1:
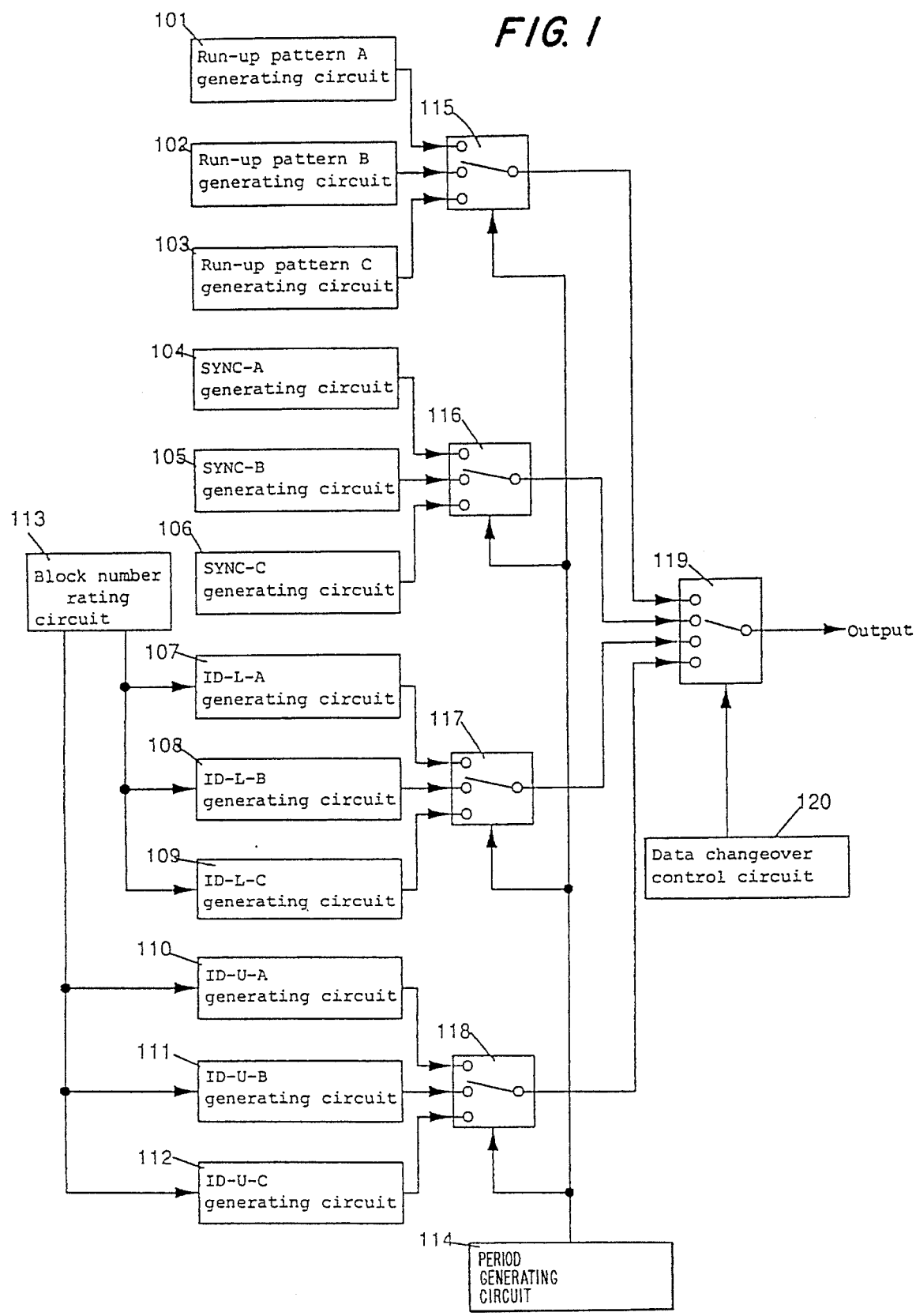
FIG. 1 is a block diagram of an insert information generating circuit of an embodiment of the preset invention.

FIG. 1 shows an insert information generating circuit of the embodiment. A run-up pattern A generating circuit 101, a run-up pattern B generating circuit 102, and a run-up pattern C generating circuit 103 are circuits for generating run-up pattern A, run-up pattern B, and run-up pattern C, respectively. A SYNC-A generating circuit 104, a SYNC-B generating circuit 105, and a SYNC-C generating circuit 106 are respectively circuits for generating SYNC-A, SYNC-B, and SYNC-C. A block number generating circuit 113 is a circuit for generating a block number to be recorded in each sync block. An ID-L-A generating circuit 107, an ID-L-B generating circuit 108, and an ID-L-C generating circuit 109 respectively generate ID-L-A, ID-L-B, and ID-L-C by receiving the lower 3 bits of the block number issued from the block number generating circuit 113. An ID-U-A generating circuit 110, an ID-U-B generating circuit 111, and an ID-U-C generating circuit 112 respectively generate ID-U-A, ID-U-B, and ID-U-C by receiving the upper 3 bits of the block number issued from the block number generating circuit 113. A period generating circuit 114 issues a 2-bit control signal. This 2-bit control signal is 0 in the first 40 bits when the pilot signal is 1/90 of the recording frequency as in the case of the type F1 pattern, and is 1 in the next 10 bits, and 2 in the next 40 bits. In the F2 pattern, the control signal is repeatedly 0 and 2 every 30 bits, and it is always 1 in the F0 pattern. A period generating circuit 114 repeatedly issues the 2-bit control signal while recording the regions G1 and ITI. A switch circuit 115 selects the output of the run-up pattern A generating circuit 101 when the output of the period generating circuit 114 is 0, selects the output of the run-up pattern B generating circuit 102 when 1, and selects the output of the run-up pattern C generating circuit 103 when 2. A switch circuit 116 selects the output of the SYNC-A generating circuit 104 when the output of the period generating circuit 114 is 0, selects the output of the SYNC-B generating circuit 105 when the output of the period generating circuit 114 is 1, and selects the output of the SYNC-C generating circuit 106 when the output of the period generating circuit 114 is 2. A switch circuit 117 selects the output of the ID-L-A generating circuit 107 when the output of the period generating circuit 114 is 0, selects the output of the ID-L-B when the output of the period generating circuit 114 is 1, and selects the output of the ID-L-C generating circuit 109 when the output of the period generating circuit 114 is 2. A switch circuit 118 selects the output of the ID-U-A generating circuit 110 when the output of the period generating circuit 114 is 0, selects the output of the ID-U-B generating circuit 111 when the output of the period generating circuit 114 is 1, and selects the output of the Id-U-C generating circuit 112 when the output of the period generating circuit 114 is 2. A data change-over control circuit 120 issues a 2-bit control signal, and this control signal is 0 when recording the region G1, 1 when recording the synchronization codeword in the region ITI, 2 when recording the ID codeword-L of the region ITI, and 3 when recording the ID codeword-U of the region ITI. A switch circuit 119 selects the output of the switch circuit 115 when the control signal entered from the data changeover control circuit is 0. When the control signal from the data changeover control circuit is 1, the output of the switch circuit 116 is selected, when the control signal from the data changeover control circuit is 2, the output of the switch circuit 117 is selected, and when the control signal form the data changeover control circuit is 3, the output of the switch circuit 118 is selected. In this way, data of the region G1 to ITI can be issued from the switch circuit 119.

Figure 2:
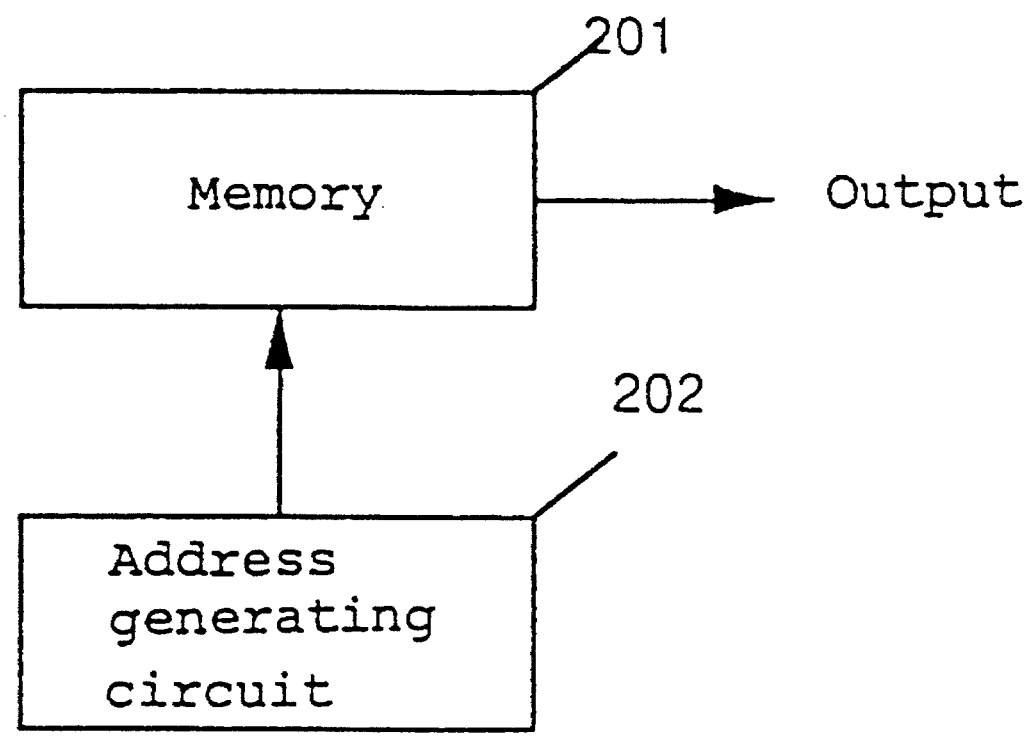
FIG. 2 is a block diagram of an insert information generating circuit of another embodiment of the present invention.

The insert information generating circuit may be also realized in a circuit configuration shown in FIG. 2. The bit rows recorded in the regions G1 and ITI are predetermined bit rows. Therefore, by storing the bit rows recorded in the regions G1 and ITI in a memory device, the bit rows stored in the memory device are output when recording. A memory 1 in FIG. 2 is a memory circuit, and bit rows to be recorded in the regions G1 and G2 are stored in advance. A memory 201 issues the stored bit rows according to the address signal of an address generating circuit 202. The address generating circuit 202 issues an address signal to the memory 201 so that the bit rows of G1 and ITI may be delivered from the memory 201. The memory 201 may be also realized by combining logic elements, instead of using a memory device.

In the foregoing embodiment, frequencies f1 and f2 of the pilot signals are 1/90 and 1/60 of the recording frequency, respectively. When frequencies f1 and f2 of the pilot signals are 1/60 and 1/40 of the recording frequency, respectively, by arranging the disparities of every 10 bits of bit rows of the regions G1 and ITI as shown in FIG. 20, the pilot signals can be generated at frequencies f1 and f2. By disposing 10-bit codewords in this way, in the case of the type F0 pattern, the cumulative value of disparities in every 10 bits is always 0, and the cumulative value of disparities in every 10 bits of the type F1 pattern increases or decreases in a period of 60 bits. Also, the cumulative value of disparities of every 10 bits of the type F2 pattern increases or decreases in a period of 40 bits. Thus, there are peaks at frequency f1 of the type F1 pattern and frequency f2 of the type F2 pattern. Meanwhile, the peak levels of frequency f1 and frequency f2 of the type F0 pattern are sufficiently smaller than the peak levels of frequency f1 of the type F1 pattern and frequency f2 of the type F2 pattern.

The run-up patterns (run-up pattern A, run-up pattern B, run-up pattern C) for composing the region G1 in the case of the frequencies f1 and f2 at 1/60 and 1/40 of the recording frequency respectively, synchronization codewords (SYNC-A, SYNC-B, SYNC-C) for composing the region ITI, the ID codeword-U (ID-U-A, ID-U-B, ID-U-C), and the ID codeword-L (ID-L-A, ID-L-B, ID-L-C) can use exactly the same codewords as in the case of frequencies f1 and f2 at 1/90 and 1/60 of the recording frequency respectively. Meanwhile, the insert information generating circuit for generating data to be recorded in the regions G1 and ITI may be realized by the circuits shown in FIG. 1 and FIG. 2 as in the case in which the frequencies f1 and f2 are 1/90 and 1/60 of the recording frequency, respectively.

The operation is described below in the case where the frequencies f1 and f2 of the period generating circuit 114 in FIG. 1 are at 1/60 and 1/40, respectively. In the case of type F0, the period generating circuit 114 always issues 1, in the case of the type F1, 0 and 2 are issued alternately in every 30 bits, and in the case of the type F2, 0 and 2 are issued alternately in every 20 bits. A switch circuit 115 selects the output of the run-up pattern A generating circuit 101 when the output of the period generating circuit 114 is 0, selects the output of the runup pattern B generating circuit 102 when the output of the period generating circuit 114 is 1, and selects the output of the run-up pattern C generating circuit 103 when the output of the period generating circuit 114 is 2. A switch circuit 116 selects the output of SYNC-A generating circuit 104 when the output of the period generating circuit 114 is 0, selects the output of the SYNC-B generating circuit 105 when the output of the period generating circuit 114 is 1, and selects the output of the SYNC-C generating circuit 106 when the output of the period generating circuit 114 is 2. A switch circuit 117 selects the output of the ID-L-A generating circuit 107 when the output of the period generating circuit 114 is 0, selects the output of the ID-LB generating circuit 108 when the output of the period generating circuit 114 is 1, and selects the output of the ID-L-C generating circuit 109 when the output of the period generating circuit 114 is 2. A switch circuit 118 selects the output of the ID-U-A generating circuit 110 when the output of the period generating circuit 114 is 0, selects the output of the ID-U-B generating circuit 111 when the output of the period generating circuit 114 is 1, and selects the output of the ID-U-C generating circuit 112 when the output of the period generating circuit 114 is 2. The other blocks in FIG. 1 operate in the same manner as in the case of the frequencies f1 and f2 being 1/90 and 1/60, respectively.

Explained next is the operation in the case where the pilot frequencies f1 and f2 of the period generating circuit 114 in FIG. 2 are at 1/60 and 1/40, respectively. By preliminarily storing the data rows of the regions G1 and ITI when the frequencies f1 and f2 are 1/60 and 1/40 of the recording frequency, respectively, in a memory 201, the data rows stored at the time of recording are issued. An address generating circuit 202 sends an address signal to a memory 201 so that the data rows in the regions G1 and ITI may be issued from the memory 201. Incidentally, the memory 201 may also be realized by combining logic elements, instead of memory elements.

What is claimed is:

1. A data recording method comprising:

recording at least one of audio data and video data on a plurality of regions of a recording medium;

generating at least one synchronization codeword;

generating at least one ID codeword;

combining the at least one synchronization codeword and the at least one ID codeword to obtain insert information; and recording the insert information on the recording medium, the insert information replacing the at least one of the audio data and the video data in at least one of the plurality of regions of the recording medium;

wherein said generating of the at least one ID codeword includes, (a) converting an m-bit data block into a 2m-bit data block by once repeating each bit of the m-bit data block, (b) 2T pre-coding the 2m-bit data block with an initial bit value of 01 or 10 to obtain a (2m+2)-bit data block beginning with the initial bit value, and (c) adding k dummy bits to the (2m+2)-bit data block to obtain an ID codeword having 2m+2+k bits, wherein the k dummy bits have a disparity between a total number of 1 bits and a total number of 0 bits which is +i, wherein i is an integer 0 or −i.

2. A data recording method as claimed in claim 1, wherein a cumulative value of the disparity of each 2m+2+k bits of the insert information fluctuates from zero to a peak value and back to zero in a period which corresponds to a period of a pilot signal.

3. A data recording method as claimed in claim 2, wherein a frequency of the pilot signal is 1/90, 1/60 or 1/40 of a recording frequency of the at least one of the audio data and the video data.

4. A data recording method as claimed in claim 2, wherein 2m+2+k equals 10, and wherein the period of the cumulative value of the disparities of the insert information is 90 bits, 60 bits or 40 bits.

5. A data recording method as claimed in claim 1, wherein the dummy bits are selected such that the ID codeword has a disparity of zero.

6. A data recording method as claimed in claim 1, wherein m is 3.

7. A data recording method as claimed in claim 1, wherein m is 6.

8. A data recording method as claimed in claim 1, wherein k is 2.

9. A data recording method as claimed in claim 2, wherein k is 2.

10. A data recording method as claimed in claim 6, wherein k is 2.

11. A data recording method as claimed in claim 7, wherein k is 2.

12. A data recording method as claimed in claim 1, wherein i is 2.

13. A data recording method as claimed in claim 2, wherein i is 2.

14. A data recording method as claimed in claim 6, wherein i is 2.

15. A data recording method as claimed in claim 7, wherein i is 2.

16. A data recording method as claimed in claim 8, wherein i is 2.

17. A data recording method as claimed in claim 9, wherein i is 2.

18. A data recording method as claimed in claim 10, wherein i is 2.

19. A data recording method as claimed in claim 11, wherein i is 2.

20. A data recording apparatus comprising:

means for recording at least one of audio data and video data on a plurality of regions of a recording medium;

means for generating at least one synchronization codeword;

means for generating at least one ID codeword;

means for combining the at least one synchronization codeword and the at least one ID codeword to obtain insert information; and means for recording the insert information on the recording medium, the insert information replacing the at least one of the audio data and the video data in at least one of the plurality of regions of the recording medium;

wherein said means for generating the at least one ID codeword includes, (a) means for converting an m-bit data block into a 2m-bit data block by once repeating each bit of the m-bit data block, (b) means for 2T pre-coding the 2m-bit data block with an initial bit value of 01 or 10 to obtain a (2m+2)-bit data block beginning with the initial bit value, and (c) means for adding k dummy bits to the (2m+2-bit data block to obtain an ID codeword having 2m+2+k bits, wherein the k dummy bits have a disparity between a total number of 1 bits and a total number of 0 bits which is +i, wherein i is an integer 0 or −i.

* * * * *